Nov. 16, 1948.  A. R. GRAY  2,453,903
THEFT ALARM SYSTEM FOR AUTOMOBILES
Filed Aug. 23, 1945  2 Sheets-Sheet 1
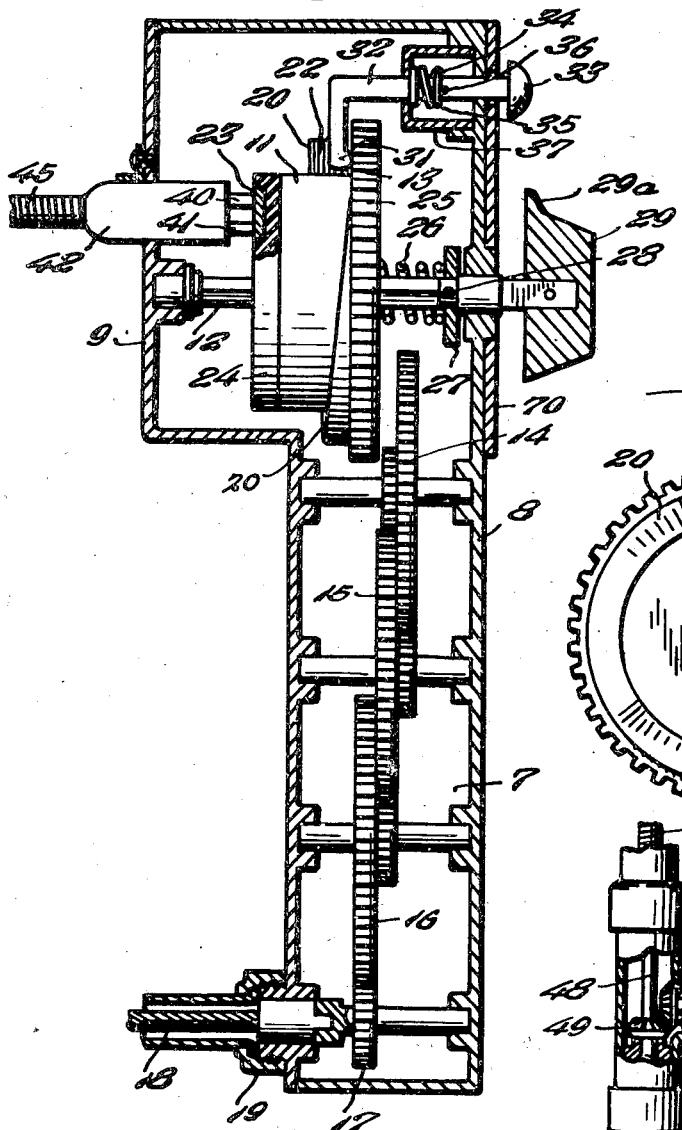
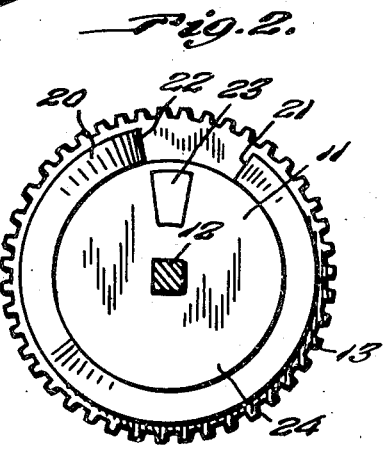
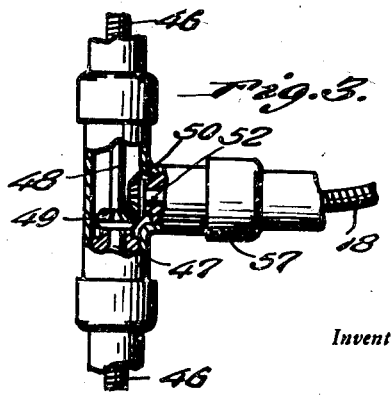
Inventor
Alfred R. Gray
By Clarence A. O'Brien
and Harvey B. Jacobson
Attorneys Nov. 16, 1948.  A. R. GRAY  2,453,903
THEFT ALARM SYSTEM FOR AUTOMOBILES
Filed Aug. 23, 1945  2 Sheets-Sheet 2
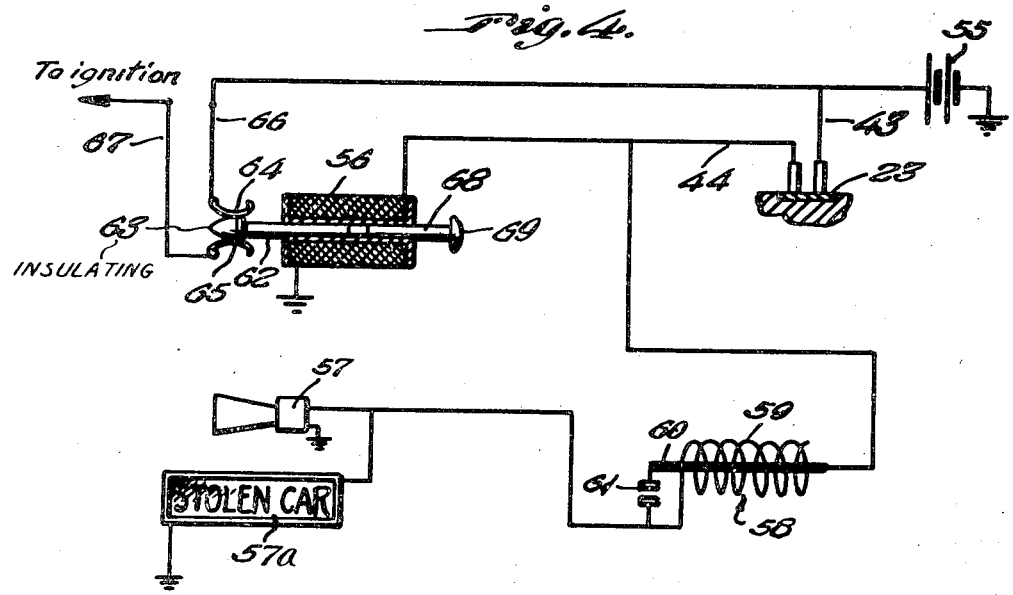
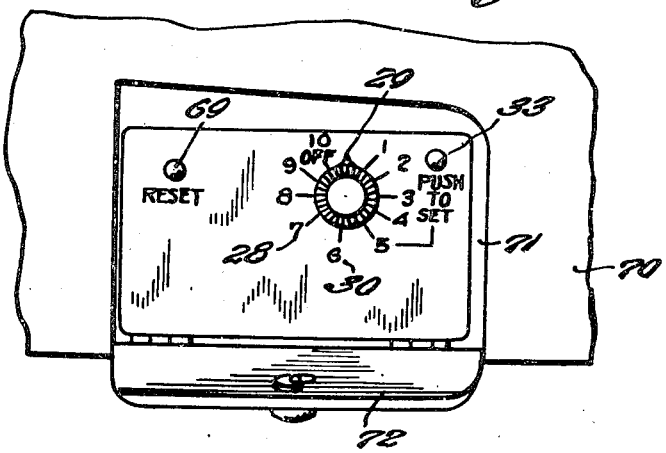
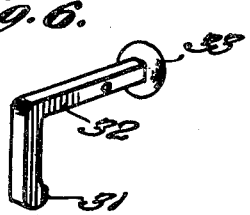
Inventor
Alfred R. Gray
By *Clarence A. O'Brien and Harvey B. Jacobson*
Attorneys Patented Nov. 16, 1948

2,453,903

UNITED STATES PATENT OFFICE 2,453,903

THEFT ALARM SYSTEM FOR AUTOMOBILES

Alfred R. Gray, Bronx, N. Y.

Application August 23, 1945, Serial No. 612,152

4 Claims. (Cl. 177—314)

This invention relates to theft alarm systems for automobiles by means of which the illicit use of the automobile may be prevented. Known theft alarm systems, as a rule, display or sound signals when an ignition key is inserted into the ignition lock or when a door or window is opened or when the position of the automobile is changed slightly when boarded. Theft alarms of this type can, however, only be switched in where the automobile may be left standing at a definite place. However, the automobile owner wants to prevent illicit use of his automobile also under other circumstances, for instance, when the automobile is turned in at a garage and when a limited use of the automobile is necessary or permissible, such as the moving of the automobile within the garage, the driving from the place where the automobile is left to the garage or the driving from the garage to the owner's residence or the like.

It is the primary object of the present invention to provide a theft alarm permitting such limited use of the automobile to an extent which may be fixed individually in accordance with existing conditions. This alarm has to be simple and effective and should not be a time controlled alarm.

According to the invention the alarm device is driven in the same way in which the speedometer is driven, or is driven from the speedometer by means of a flexible shaft and it consists in a contact making disk which establishes the alarm circuit and which may be set to any distance in miles which may be covered before the alarm goes off. The alarm circuit itself may then stop the motor and actuate display and sound signals clearly indicating that the automobile is driven by persons who have appropriated its use without authority to do so.

It will be noted that in addition to the advantage of permitting a limited use, such as may be required, the alarm has the further advantage of going off surprisingly at a moment which, as a rule, will not be known to the illicit user so that no precautionary measures are likely to have been taken in time.

The invention is illustrated in the accompanying drawing, showing one embodiment of the invention by way of example. It is, however, to be understood that the specific example shown and described is intended to be illustrative and that both specification and drawing foreshadow other embodiments to experts skilled in the art. Such further embodiments, using the same basic principle are, therefore, part of the invention and do not form a departure from its essence.

In the drawings:

Figure 1 is an elevational sectional view of one modification of the arrangement.

Figure 2 is an elevational view of the rear side of the disk forming the adjustable element of the alarm.

Figure 3 is a detail view of the drive partly in section and partly in elevation.

Figure 4 is a diagram of connections illustrating the alarm circuit.

Figure 5 is an elevational view of the front panel of the alarm apparatus when enclosed in a compartment whose lid or cover has been lowered.

Figure 6 is a persepctive view of a detail.

The mechanical parts of the alarm device are enclosed in a casing 7 which may be mounted in the glove compartment on the dashboard or at some other convenient place which is easily accessible. This casing has a front section 8 and a back wall 9 and it encloses the adjustable mileage cylinder 11 which is slidably mounted on a square shaft 12, or on any other shaft which is capable of rotating the cylinder while allowing axial movement of the same.

The cylinder 11 is provided with a toothed wheel 13 meshing in one of its positions with gear trains 14, 15, 16 driven by means of the gear wheel 17 which is coupled with a flexible shaft 18 by means of a coupling 19. The gear trains 14, 15, 16 are merely shown by way of example. It is to be understood that other transmissions, such as worm gears, may be used for either reducing the number of gear trains or for increasing the mileage required to produce one revolution of the cylinder.

The mileage cylinder 11 is provided with an incline or axial cam surface 20 which starts at line 21 (Figure 2) and ends abruptly at 22 in a radial step.

Between the radially directed surface of the step 22 of the incline 20 and the line 21 where the incline begins to rise part of the cylindrical surface is left uncovered by the incline or cam surface. The rear part 24 of the mileage cylinder consists of insulating material and in the midst of this insulating material a contact plate 23 is arranged. This plate is so arranged that a radial plane passing through the end surface 22 of the incline will also pass through some part of the contact plate 23 for a purpose to be described.

Against the front surface 25 of the mileage cylinder a spring 26 is pressed which finds its countersupport on a retainer disk 27 secured to the shaft 12 by means of a pin 28. The spring presses the mileage cylinder towards the rear, as the shaft 12 is held in the casing 7 against axial movement.

The said shaft projects outwardly and carries a knob 29 provided with a pointer 29a secured thereto which cooperates with a scale 30 (Fig. 5) arranged in front of the casing.

The mileage cylinder moreover cooperates with a guide member 31 attached to the end of a push rod 32 which carries a push button 33. The push rod is under the pressure of a strong spring 34 which presses the guide member against the incline 20. The spring presses against a disc 35, secured on the push rod 32 by means of a pin 36, and finds its support on the bottom of a cup-shaped member 37 projecting inwardly from the cover of the casing.

The guide member 31 rests on the incline 20 and thereby determines the axial position of the mileage cylinder, which is pressed towards the front 8 of the casing when the incline passes under the guide member.

When the cylinder has been rotated to the point at which the step 22 has passed under the guide, the mileage cylinder will snap backwardly under the pressure of the compressed spring 26 and the toothed wheel 13 will disengage itself from the gear train 17. At the same time the contact plate 23 comes into contact with two contact prongs 40, 41 of a plug 42 which are connected with conductors 43, 44 (Figure 4) enclosed in an armored cable 45.

To drive the gear trains by means of the flexible shaft 18 a special connection may be made with the axles or wheels of the automobile but it is preferable to use the already existing speedometer connection. A branch drive may be mounted on the speedometer cable 46 as shown in Figure 3. The cable 46 is led to a T-sleeve 47 enclosing a shaft 48 carrying a bevel gear wheel 49. This gear wheel meshes with another bevel gear wheel 50 on a shaft 52 passing through the middle member 51 of the T-sleeve. The shaft 50 is then connected with the flexible shaft 18 by the usual coupling means.

The alarm circuit (Figure 4) which is connected to the battery 55 of the automobile, comprises a solenoid 56, the signals 57 and 57a one of which may be a visual display signal while the other is an acoustic signal and the thermal flashing device 58 for producing intermittent signals. The latter device consists of a heater coil 59 radiating heat to a bi-metallic strip 60 which forms a contact arm carrying the contact 61. The coil 59 when used in the connection as shown in Figure 4 is of comparatively high resistance and the current flowing through it is not of sufficient power to operate one of the signals or both. The heat generated by it causes, however, the bi-metallic strip to bend thereby closing contacts 61, whereby the coil is short circuited and a current of full strength passes to the signals. The coil when short circuited ceases to radiate heat and the arm 60 thereby opens up contacts 61. The signals are thus operated at intervals which may be adjusted by selecting and adjusting properly the bi-metallic strip.

The solenoid 56 when energized operates a contact rod 62 carrying an insulating head 63 which is moved into a position separating the contacts 64 and 65 and interrupting the flow of current to the ignition device over conductors 66, 67. When the alarm circuit 43, 44 is closed, the engine of the automobile will, therefore, be stopped simultaneously with the operation of the signals directing attention to the illicit use of the automobile.

The solenoid core 62 may be pushed back by a rod 68 attached to a reset button 69 which is preferably so mounted on the panel or dial that it is close to the other controls of the alarm.

The front panel 70 mounted on the casing, therefore, contains the dial 30 for setting the mileage cylinder, the knob 29 and pointer 29a connected with shaft 12 arranged for the same purpose, the push button 33 which may be pressed during the setting of the dial to facilitate setting and the reset button 69 for closing the ignition circuit again after interruption by the alarm circuit.

The entire device or its upper part containing the panel is best locked up within a compartment 71 to be closed and locked by a lid 72.

The operation of the device will be clear from the detailed description. If the owner of the automobile wants to permit the use of his automobile for a certain mileage, say 2 miles, he presses button 33 and sets the knob 29 and pointer 29 accordingly. The pressure of the button 33 relieves the pressure of the guide piece 31 on the incline and the increasing friction between these parts. The mileage cylinder is now in an angular position in which the automobile when covering a distance of 2 miles will have moved the end surface 22 under the guide 31. Further travel will cause the passage of the guide over the edge of 22 and the cylinder 11 will under the influence of spring 26 snap back and assume the position shown in Figure 1. In this position the toothed wheel 13 driving the cylinder is out of gear and the contact surface 23 bridges the contact prongs 40, 41. The alarm circuit 43, 44 is thereby closed, the ignition is interrupted and the signals are intermittently operated in the manner already described.

Other operations have already been described.

The main advantage of the device is the limited operation of the automobile through a predetermined distance adjustable according to requirements, which it provides before giving the alarm signal. This alarm, as is seen, is not dependent on any condition of the ignition locking device as most alarms are and can hardly be set off accidentally. The alarm will also set in when the automobile is towed as it does not depend on the running of the motor.

The alarm may, of course, also be set for immediate operation.

It is obvious to the expert skilled in this art that many modifications may be made in the construction and arrangement of parts and in the circuits without modifying the general idea on which the invention is based.

I claim:

1. In a theft alarm system for automobiles in combination, an alarm circuit containing alarm signals and alarm contacts, an axially displaceable and rotatable member, means for driving said member slowly during actual travel of the automobile, including a drive gear mechanism in operative engagement with said member, a contact member carried by said slowly rotatable member, automatic means for axially displacing the said slowly driven rotatable member after a predetermined angle of rotation, thereby moving the contact member into operative engagement with the alarm contacts in the alarm circuit and moving the said member out of engagement with the driving gear, and further means for adjusting said predetermined angle during which the said member is rotated without axial displacement.

2. In a theft alarm system of the character described as specified in claim 1, a shaft, a cylinder, axially displaceable on and mounted for rotation with said shaft, a guide member resiliently mounted on said casing, a spring member supported by said shaft and pressing against the cylinder, a stepped portion on said cam surface, and a guide member pressed against said cam surface by the action of said spring.

3. In a theft alarm system for automobiles with an alarm circuit containing an alarm signal, means for operating said alarm signal after a predetermined mileage, comprising an axially displaceable adjustable and rotatable mileage counting member, provided with a stepped cam surface, a guide member cooperating with said surface, producing an axial displacement of the said mileage counting member after advance through a predetermined angle of rotation, a driving gear for rotating said mileage counting member in conformity with the distance traveled by the automobile, hand operated adjusting members connected with the mileage counting member for adjusting the angular position of said member and alarm contacts included in said alarm circuit, adapted to come into operative engagement upon axial displacement of said mileage counting member.

4. In a theft alarm system for automobiles an alarm circuit, alarm signals and alarm contacts arranged in said circuit, a casing, a shaft fixedly journalled in said casing, a rotatable member carried by said shaft, and coupled with the same for rotation, said member being axially displaceable on said shaft, an axially operative cam on said member provided with a stepped portion, a guide member mounted in said casing cooperating with said cam surface for shifting said rotatable member along the shaft, spring means associated with said shaft for holding said guide member and cam in operative engagement, a knob on said shaft and a scale on the front side of the casing for adjusting the initial position of said rotatable member, a contact member on said rotatable and axially displaceable member, cooperating with the alarm contacts upon axial displacement of the member due to the stepped portion of the cam so as to close the alarm circuit, means for driving the rotatable member while the automobile is in motion, said means comprising driving gear trains, a flexible shaft deriving its motion from a part of the automobile which is moving when the automobile is actually travelling on the road, and a driven gear attached to said rotatable and axially displaceable member engaging said gear train when the guide cooperating with the cam surface keeps said member in a predetermined axial position, but disengaging said driven gear from said gear train when the stepped portion of the automobile causes an axial displacement.

ALFRED R. GRAY.

REFERENCES CITED

The following references are of record in the file of this patent:

UNITED STATES PATENTS

| Number | Name | Date |
|---|---|---|
| 1,284,328 | Haynes et al. | Nov. 12, 1918 |
| 1,435,675 | Vollmer et al. | Nov. 14, 1922 |
| 1,445,529 | Mathews | Feb. 13, 1923 |
| 1,555,143 | Mitkos | Sept. 29, 1925 |
| 1,686,295 | Schoultz | Oct. 2, 1928 |
| 1,815,206 | Mathews | July 21, 1931 |
| 2,052,080 | Cale | Aug. 25, 1936 |
| 2,130,290 | Polta et al. | Sept. 13, 1938 |